United States Patent
Fukuhara (10) Patent No.: US 11,719,640 B2
(45) Date of Patent: Aug. 8, 2023

(54) SLIDING BODY SURFACE EVALUATION METHOD AND SLIDING BODY SURFACE EVALUATION APPARATUS

(71) Applicant: Eagle Industry Co., Ltd., Tokyo (JP)

(72) Inventor: Takuto Fukuhara, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 17/278,229

(22) PCT Filed: Sep. 26, 2019

(86) PCT No.: PCT/JP2019/037898
§ 371 (c)(1),
(2) Date: Mar. 19, 2021

(87) PCT Pub. No.: WO2020/067306
PCT Pub. Date: Apr. 2, 2020

(65) Prior Publication Data
US 2021/0349026 A1     Nov. 11, 2021

(30) Foreign Application Priority Data
Sep. 28, 2018   (JP) .................. 2018-184006

(51) Int. Cl.
*G01N 21/64*   (2006.01)
(52) U.S. Cl.
CPC .................. *G01N 21/6456* (2013.01); *G01N 2201/06113* (2013.01)

(58) Field of Classification Search
CPC ..... G01N 21/6456; G01N 2201/06113; G01N 2021/646; G01N 21/8806; G01N 21/95; G01N 21/6458
See application file for complete search history.

(56) References Cited

U.S. PATENT DOCUMENTS

| 4,892,419 A | * | 1/1990 | Inoue ................ F16C 33/043 384/322 |
| 2007/0202007 A1 | * | 8/2007 | Augstein ............. G01N 27/26 324/649 |

(Continued)

FOREIGN PATENT DOCUMENTS

| JP | 2000-162127 | 6/2000 | ............. G01N 21/64 |
| JP | 2002-243643 | 8/2002 | ............. G01N 21/70 |

(Continued)

OTHER PUBLICATIONS

Translation of JP 2010025671 A (Year: 2010).*

(Continued)

*Primary Examiner* — David P Porta
*Assistant Examiner* — Mamadou Faye
(74) *Attorney, Agent, or Firm* — Hayes Soloway P.C.

(57) ABSTRACT

There is provided is sliding body surface evaluation method and apparatus configured so that a temporal change in a transformed portion at a sliding portion of a sliding body can be observed. The method includes a first step of irradiating, with an electromagnetic wave, a sliding portion of a sliding body sliding on a sliding target body, a second step of detecting light emitted from the sliding portion irradiated with the electromagnetic wave, and a third step of deriving a change in a light emission state of the sliding portion.

14 Claims, 9 Drawing Sheets

(56) References Cited

U.S. PATENT DOCUMENTS

2010/0004115 A1    1/2010   Ishimine et al. ............... 501/90
2012/0112416 A1    5/2012   Berger et al. ................. 277/358

FOREIGN PATENT DOCUMENTS

| | | | |
|---|---|---|---|
| JP | 2007-321797 | 12/2007 | ............... F16J 15/34 |
| JP | 2009-281970 | 12/2009 | ............ G01B 21/08 |
| JP | 2010-25671 | 2/2010 | ............ G01B 11/06 |
| JP | 2010025671 A * | 2/2010 | |
| JP | 2011-220744 | 11/2011 | ............ G01N 21/64 |
| JP | 5037444 | 7/2012 | ............ G01B 11/06 |
| JP | 2012-529602 | 11/2012 | ............... F16J 15/34 |
| WO | WO-0037813 A1 * | 6/2000 | ............... F16C 33/30 |
| WO | WO 2008/053903 | 5/2008 | ............... F16J 15/34 |

OTHER PUBLICATIONS

Lafon-Placette et al. "Tribological characterization of silicon carbide and carbon materials", HAL open science, 2015, p. 1-15. (Year: 2015).*

Giuseppe et al. "Fluorescence spectroscopic analysis of surface and subsurface residual stress fields in alumina hip joints" Journal of Biomedical Optics 11(2), (Mar./Apr. 2006) p. 024009-1-024009-10. (Year: 2006).*

Translation of WO-0037813 A1 (Year: 2000).*

International Search Report and Written Opinion issued in PCT/JP2019/037898, dated Dec. 9, 2019, with English translation, 17 pages.

International Preliminary Report on Patentability issued in PCT/JP2019/037898, dated Mar. 23, 2021, 6 pages.

European Search Report issued in European Patent Application Serial No. 19865096, dated May 9, 2022, 8 pages.

* cited by examiner

SLIDING BODY SURFACE EVALUATION METHOD AND SLIDING BODY SURFACE EVALUATION APPARATUS

TECHNICAL FIELD

The present invention relates to sliding body surface evaluation method and apparatus for observing a sliding portion of a sliding body.

BACKGROUND ART

In a rotatably-moving apparatus such as a crankshaft, a gear, or a pulley or a reciprocating apparatus such as a piston, there is a sliding portion where separate members slide on each other to generate friction. Regarding such friction of the sliding portion, a phenomenon that due to initial sliding, the coefficient of friction of a sliding body particularly made of silicon carbide rapidly decreases and becomes stable after the coefficient of friction of the sliding portion has temporarily increased, i.e., a so-called "running-in" phenomenon, has been known. For example, in a sliding body such as a rotating seal ring or a stationary seal ring forming an apparatus configured to seal a rotary shaft of a fluid machine, such as a mechanical seal, if the coefficient of friction of the sliding portion does not sufficiently decrease due to the "running-in" phenomenon, a problem that seal performance of the mechanical seal cannot be ensured is caused in addition to an adverse effect on drive performance of the fluid apparatus. For this reason, observation of the sliding portion is useful in evaluation of the performance of the mechanical seal, and various methods are used for such observation.

For example, the sliding portion observation method includes an observation apparatus as described in Patent Citation 1. The observation apparatus of Patent Citation 1 includes a holding tool configured to hold a sliding body as a test piece and drive means configured to rotate a light-permeable sliding target body. The observation apparatus irradiates sliding surfaces of the sliding body and the sliding target body with light from a light source, receives light having reflected on the sliding surface and having penetrated the sliding target body by a digital camera, and obtains an image of the sliding surface.

CITATION LIST

Patent Literature

Patent Citation 1: Japanese Patent No. 5037444 (page 7, FIG. 2)

SUMMARY OF INVENTION

Technical Problem

In Patent Citation 1, the sliding target body is light-permeable glass. Thus, the image of the sliding surface of the rotatably-driven sliding body can be obtained, and recessed and raised portions of the sliding surface and an oil film during sliding can be visually observed. Meanwhile, it has been known that an event influencing a decrease in the coefficient of friction of the sliding portion is not limited to the surface shape of the sliding surface and an interposed oil film state and a transformed portion of a base material due to friction of the sliding portion also provides influence. However, the technique of Patent Citation 1 is not intended to observe a temporal change in the transformed portion of the sliding portion, and fails to perform such observation.

The present invention has been made in view of such a problem, and is intended to provide sliding body surface evaluation method and apparatus configured so that a temporal change in a transformed portion at a sliding portion of a sliding body can be observed.

Solution to Problem

In order to solve the above-described problem, a sliding body surface evaluation method according to the present invention includes: a first step of irradiating, with an electromagnetic wave, a sliding portion of a sliding body sliding on a sliding target body; a second step of detecting light emitted from the sliding portion irradiated with the electromagnetic wave; and a third step of deriving a change in a light emission state of the sliding portion. According to the aforesaid feature of the present invention, the light emitted from the sliding portion is detected, and the change in the light emission state is derived. Thus, a transformed portion chemically and geometrically transformed from a surface of the sliding body due to friction can be visualized, and a temporal change in such a transformed portion can be observed.

It may be preferable that the first step includes a step of scanning the entire surface of the sliding portion with the electromagnetic wave. According to this preferable configuration, the change in the light emission state is observed across the entire surface of the sliding portion, and therefore, e.g., a region of the sliding portion where friction reduction is likely to occur can be evaluated.

It may be preferable that the first step includes a step of irradiating the sliding portion with the electromagnetic wave while rotatably driving the sliding body. According to this preferable configuration, the sliding body is rotated so that the entire surface of the sliding portion can be easily observed.

It may be preferable that the first step includes a step of deriving a light emission region of the sliding portion. According to this preferable configuration, the course of decreasing the coefficient of friction of the sliding portion can be observed based on a change in the light emission region.

It may be preferable that the third step includes a step of excluding a region with a luminance of equal to or higher than a predetermined luminance from the light emission region. According to this preferable configuration, influence of wear powder filling pores of a surface of the sliding portion can be excluded, and a substantially-formed transformed portion region can be accurately evaluated.

It may be preferable that the first step includes a step of performing scanning with the electromagnetic wave by a confocal scanning microscope. According to this preferable configuration, the confocal scanning microscope can detect the low-luminance sliding portion, particularly light emission from the transformed portion.

It may be preferable that the first step includes a step of finely moving the focal point of the confocal scanning microscope in a depth direction of the sliding portion. According to this preferable configuration, the sliding portion can be three-dimensionally analyzed, and a transformed portion light emission area can be observed according to, e.g., the thickness or depth of the formed transformed portion.

In order to solve the above-described problem, a sliding body surface evaluation apparatus according to the present invention includes: a holding member configured to hold a sliding body; drive means configured to rotatably drive the sliding body; an irradiation device configured to irradiate a sliding portion of the sliding body with an electromagnetic wave; a detector configured to detect light emitted from the sliding portion irradiated with the electromagnetic wave; and an arithmetic device configured to derive a change in a light emission state of the sliding portion from the light detected by the detector. According to the abovementioned feature of the present invention, the light emitted from the sliding portion is detected, and the change in the light emission state is derived. Thus, a transformed portion chemically and geometrically transformed from a surface of the sliding body due to friction can be visualized, and a temporal change in such a transformed portion can be observed.

It may be preferable that the sliding body surface evaluation apparatus further includes a second holding member capable of holding a sliding target body sliding on the sliding body, the sliding target body allowing penetration of the electromagnetic wave and the light and the irradiation device being arranged at a position at which the sliding portion of the sliding body is irradiated with the electromagnetic wave through the sliding target body. According to this preferable configuration, the sliding portion of the sliding body can be irradiated with the electromagnetic wave through the sliding target body, and the light emitted from the sliding portion can be detected through the sliding target body. Thus, during sliding of the sliding body and the sliding target body, the course of changing the transformed portion of the sliding portion can be observed.

It may be preferable configuration, the sliding body is polycrystal SiC, and the sliding target body is monocrystal SiC. According to this preferable configuration, it is configured such that the electromagnetic wave and the light penetrate the sliding target body and physical characteristics of the sliding body and the sliding target body approximate to each other. Thus, the course of changing the transformed portion of the surface of the sliding portion can be observed with favorable accuracy.

It may be preferable that water is, as a lubricant, supplied to between the sliding body and the sliding target body. According to this preferable configuration, the low-viscosity water is utilized as the lubricant for the sliding portion, and therefore, a running-in phenomenon progress status of the surface of the sliding portion can be observed with favorable accuracy.

DESCRIPTION OF EMBODIMENTS

A phenomenon (see FIG. 3) that due to initial sliding, the coefficient of friction of a sliding body rapidly decreases and becomes stable after the coefficient of friction of a sliding portion has temporarily increased, i.e., a so-called "running-in phenomenon," has been known. It has been considered that in a running-in process, shear force, heat, pressure, etc. act on the sliding portion and a transformed portion formed due to a chemical and geometrical change in a surface of the sliding portion is dominant in friction reduction.

As typically known, it has been confirmed that when the sliding portion having showed friction reduction due to the "running-in phenomenon" is observed, a large portion is the transformed portion formed due to transformation and amorphization of a base material and the remaining portion is an untransformed base material portion. Moreover, it has been also confirmed that pores as fine recessed portions filled with wear powder are locally present. The inventor(s) has achieved good results in capturing of light emitted from the transformed portion itself by means of a confocal microscope, and has found that the status of generation of the transformed portion in an early stage of sliding is according to a change in the coefficient of friction and a change in roughness in the running-in process. Utilizing this phenomenon, the state of the sliding portion of the sliding body, particularly the state of the transformed portion, can be accurately grasped. Embodiments will be described hereinafter.

First Embodiment

A sliding body surface evaluation method and a sliding body surface evaluation apparatus according to a first embodiment of the present invention will be described with reference to FIGS. 1 to 7.

Figure 1:
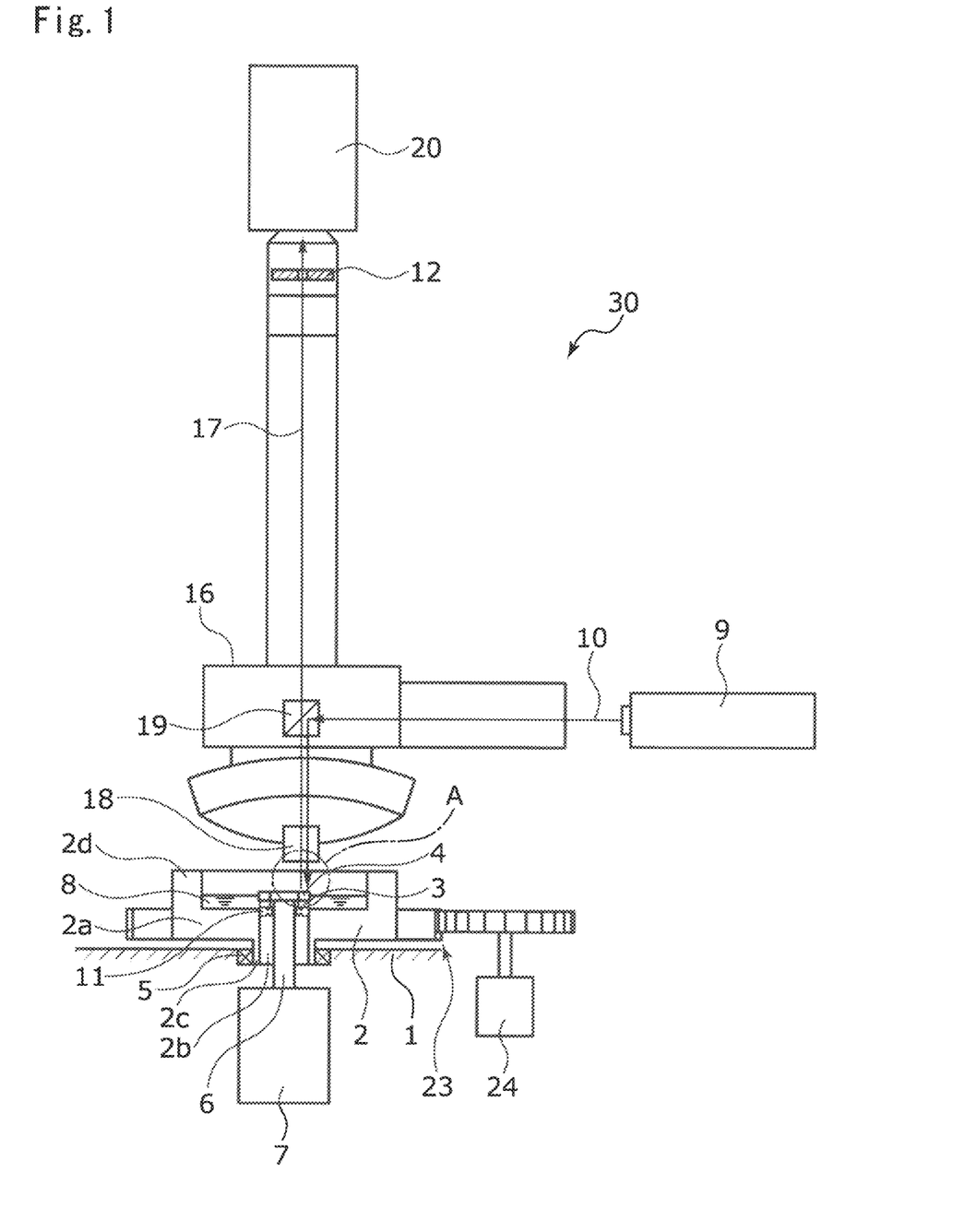
FIG. 1 is a schematic view illustrating a surface evaluation apparatus used in a sliding body surface evaluation method according to a first embodiment of the present invention.
Figure 2:
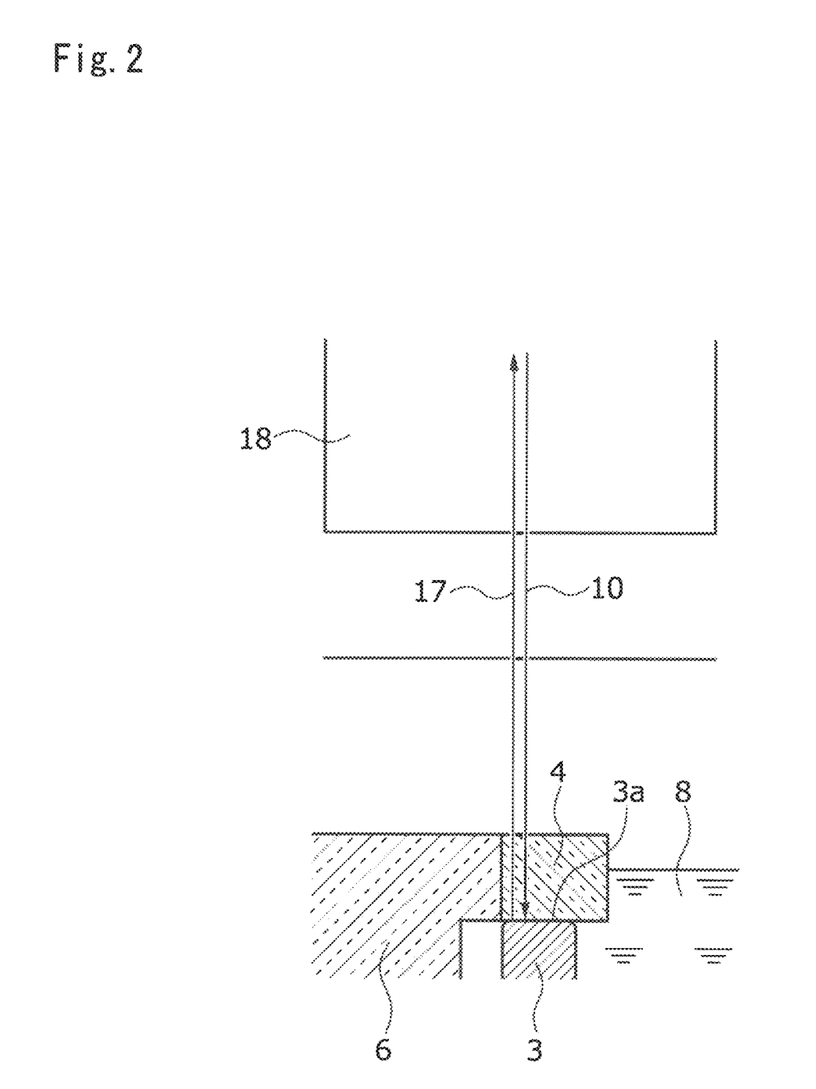
FIG. 2 is an enlarged sectional view of an opposing end surface of a sliding body in the first embodiment.

The inventor(s) has conducted an experiment to observe a surface of a sliding body. In the experiment, a surface evaluation apparatus (hereinafter merely referred to as a test machine 30) as a temperature-controllable ring-on-ring thrust friction wear test machine as illustrated in FIG. 1 was used for performing a test for sliding friction between end surfaces of silicon carbide (abbreviated as SiC) as ceramics. First, a test piece and the test machine 30 used for the experiment will be described.

A circular ring-shaped sliding body 3 made of polycrystal silicon carbide (hereinafter referred to as polycrystal SiC) and a circular ring-shaped sliding target body 4 made of monocrystal silicon carbide (hereinafter referred to as monocrystal SiC) were used as sliding bodies used as the test pieces. The polycrystal SiC forming the sliding body 3 has the same quality as those used for a rotating seal ring or a stationary seal ring of a mechanical seal used for, e.g., sealing of fluid equipment. For the sliding target body 4, the monocrystal SiC having hardness and friction coefficient characteristics equivalent to those of the polycrystal SiC but allowing, for penetration of later-described laser light 10 as excitation light, more light to penetrate the monocrystal SiC as compared to the polycrystal SiC was used. As the sliding body 3, one with an outer diameter of 18 mm, an inner diameter of 8 mm, and a thickness of 8 mm was used. As the sliding target body 4, one with an outer diameter of 16 mm, an inner diameter of 11 mm, and a thickness of 8 mm was used.

The test machine 30 includes a housing 2 rotatably coupled to a base 1 and configured to hold the sliding body 3, and the sliding target body 4 is arranged above the sliding body 3 so as to contact the sliding body 3.

The housing 2 has a discoid bottom portion 2a configured such that a through-hole 2b penetrating in an upper-lower direction is provided at a center portion, a cylindrical shaft portion 2c provided at a lower surface of the bottom portion 2a, and a cylindrical side portion 2d provided at an outer peripheral edge of the bottom portion 2a and extending upwardly. The housing 2 is rotatably coupled to the base 1 through a bearing 5 arranged at the outer periphery of the shaft portion 2c.

Moreover, the inside of the housing 2 houses water 8 with such a water level that at least opposing end surfaces of the sliding body 3 and the sliding target body 4 are immersed, and the water entering between these end surfaces functions as a lubricant in relative rotation sliding of the sliding body 3 and the sliding target body 4. Note that although not shown in the figure, the water 8 supplied to between the end surfaces of the sliding body 3 and the sliding target body 4 is purified water at 25° C., and circulates and is supplied at 60 ml/min.

The sliding body 3 is held at an upper end opening of the through-hole 2b of the housing 2 in a state in which the end surface of the sliding body 3 faces up. The sliding target body 4 is arranged above the sliding body 3 so as to contact the sliding body 3 held in the housing 2.

Moreover, each of the sliding body 3 and the sliding target body 4 is held in a state in which a load is provided to between the sliding body 3 and the sliding target body 4 from above the sliding body 3 by a not-shown load motor. This load is measured by a not-shown load cell, and is equivalent to biasing force of elastic means such as a spring configured to cause the rotating seal ring and the stationary seal ring of the mechanical seal used for, e.g., sealing of the fluid equipment to approach each other.

Further, the sliding target body 4 is fixed to an upper end portion of a rotary shaft 6 inserted into the through-hole 2b of the housing 2, and the rotary shaft 6 is coupled to a rotary drive source 7 such as a motor and is rotatable by drive of the rotary drive source 7. In addition, an annular seal 11 positioned on an outer diameter side of the rotary shaft 6 seals between the rotary shaft 6 and the through-hole 2b.

The test machine 30 includes a confocal scanning microscope 16 (manufactured by Olympus Corporation). The confocal scanning microscope 16 has a light source 9 configured to emit the laser light 10, a field lens 18, a beam splitter 19, a detector 20, and a pinhole 12 configured to eliminate scattered light from fluorescence as light having entered the detector 20.

Figure 7:
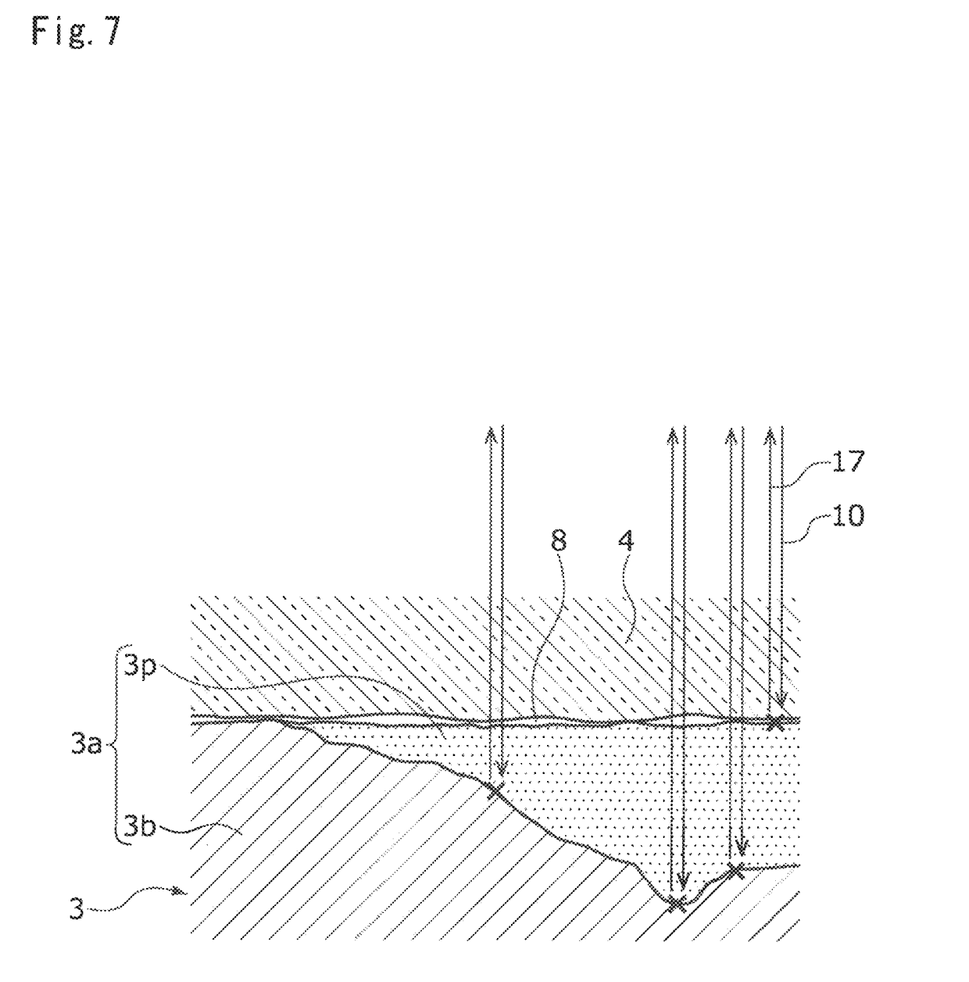
FIG. 7 is an image view illustrating a state in which the focal point of a confocal scanning microscope is finely moved in a depth direction of the sliding portion in the first embodiment.

Operation of the confocal scanning microscope 16 will be briefly described. The laser light 10 emitted from the light source 9 is reflected on the beam splitter 19 and passes through the field lens 18, and a sliding portion 3a of the sliding body 3 is irradiated with the laser light 10 through the sliding target body 4. The sliding portion 3a indicates a sliding portion 3a as a location where the sliding body 3 slides on the sliding target body 4, and as illustrated in FIG. 7, means a surface layer portion of the sliding body 3 including a transformed portion 3p and an untransformed base material portion 3b. Fluorescence 17 as a target for observation with the laser light 10 and the laser light reflected on the observation target are collected again by the field lens 18 through the sliding target body 4. Of the collected light, the reflected laser light is reflected on the beam splitter 19, and only the fluorescence 17 passes toward a detector 20 side. Scattered light is eliminated from the fluorescence 17 by the pinhole 12 before reaching the detector 20, and thereafter, the fluorescence 17 enters the detector 20. The incident fluorescence 17 is amplified in the detector 20. Although not shown in the figure, a filter configured to block the wavelength of the fluorescence emitted from the base material portion 3b is preferably provided between the beam splitter 19 and the pinhole 12.

Moreover, the beam splitter 19 is finely turned and driven by a not-shown drive mechanism so that the reflection angle thereof can be changed and an irradiation direction of the laser light 10 can be changed. Thus, a surface of the sliding portion 3a of the sliding body 3 can be scanned in a radial direction with the laser light 10. In the detector 20, the incident light is converted into digital data so that a three-dimensional image of the observation target can be produced.

The test machine 30 further includes housing rotation control means 23 configured to rotate and stop the housing at constant pitches. Specifically, a servo motor 24 is used as the housing rotation control means 23. However, teeth of a gear may be provided at the outer periphery of the housing 2, a ratchet mechanism may be provided on a base 1 side, and these teeth and the ratchet mechanism may be engaged with each other. By a combination of rotation of the housing 2 by the housing rotation control means 23 and scanning of the laser light 10 in the radial direction by change of the reflection angle of the beam splitter 19, the confocal scanning microscope 16 can scan the entire surface of the sliding portion 3a. Arithmetic analysis is performed for the image detected by the detector 20 in a not-shown arithmetic apparatus such as a personal computer, and in this manner, a fluorescence region of the sliding portion 3a, the ratio of the area of the fluorescence region to the entire surface of the sliding portion 3a, and luminance distribution can be evaluated.

The experiment for observing the sliding portion 3a of the sliding body 3 as the test piece by means of the test pieces and the test machine 30 as described above will be described.

A sliding friction test for the end surfaces of the sliding body 3 and the sliding target body 4 in the water was performed. Friction force is converted using friction torque added to a test piece tool supported by the bearing. In the experiment, the load of the load motor providing the load to between the sliding body 3 and the sliding target body 4 was 32 N, 53 N, and 212 N. Moreover, the rotational speed of the housing was 142 rpm, 284 rpm, 1420 rpm, and 2840 rpm.

The initial roughness (hereinafter referred to as Ra) of the sliding body 3 before sliding was Ra<0.1 and Ra<0.01. The initial Ra of the sliding target body 4 before sliding was Ra<0.01.

Figure 3:
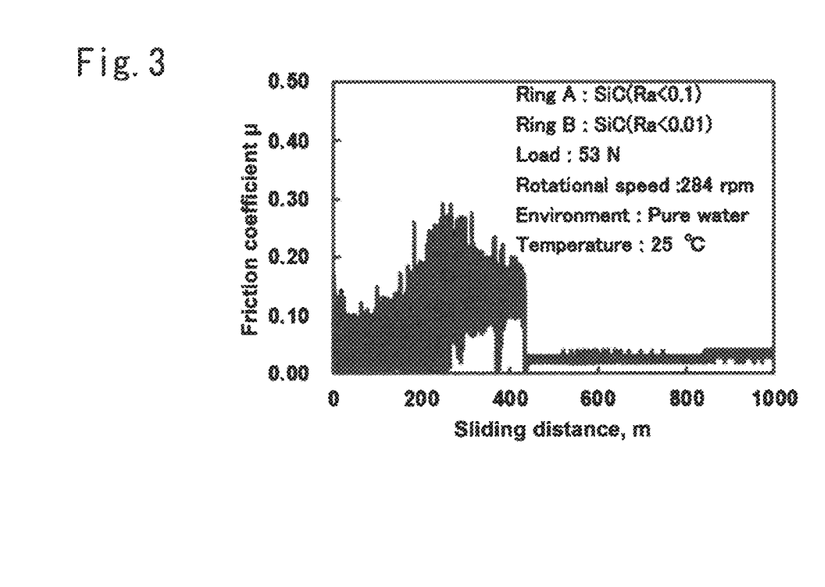
FIG. 3 is a graph illustrating the behavior of the coefficient of friction of the sliding body according to a sliding distance in the first embodiment.

The behavior of the coefficient of friction of the sliding body 3 (with Ra<0.1) in a case where the test machine 30 is used and the sliding body 3 and the sliding target body 4 slide on each other under the above-described conditions was as in FIG. 3. As seen from FIG. 3, the coefficient of friction of the sliding body 3 (with Ra<0.1) initially showed relatively-high friction, and thereafter, rapidly decreased and was maintained at equal to or lower than 0.05.

Figure 4:
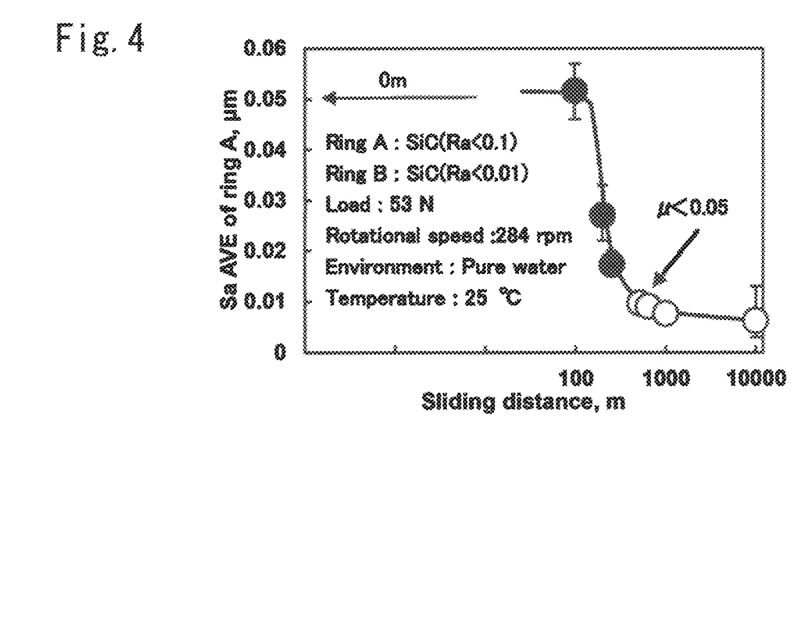
FIG. 4 is a graph illustrating the behavior of the arithmetic average height (Sa) of a sliding portion of the sliding body according to the sliding distance in the first embodiment.
Figure 5:
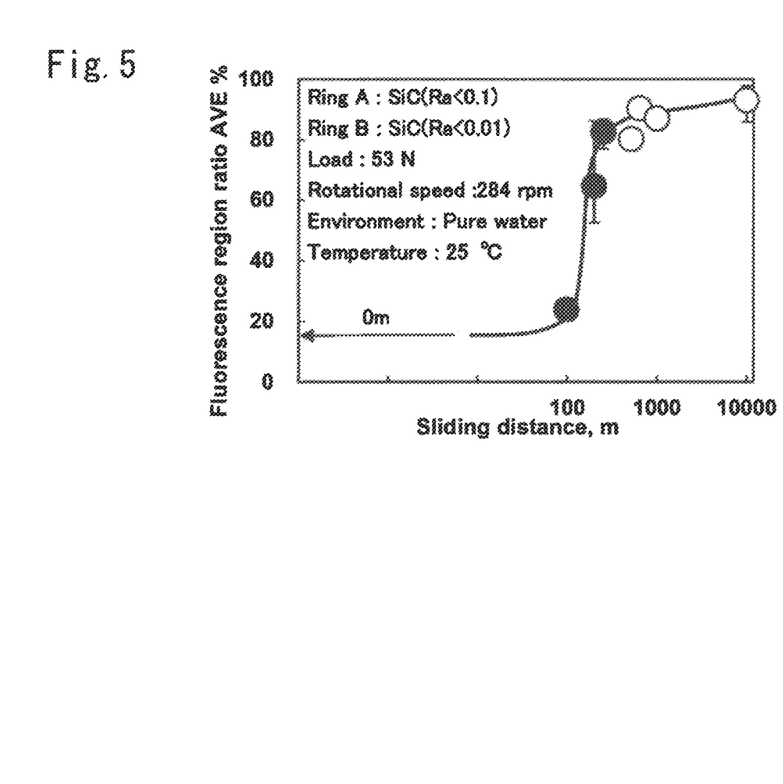
FIG. 5 is a graph illustrating the behavior of the area of a fluorescence region of the sliding portion of the sliding body according to the sliding distance in the first embodiment.
Figure 6:
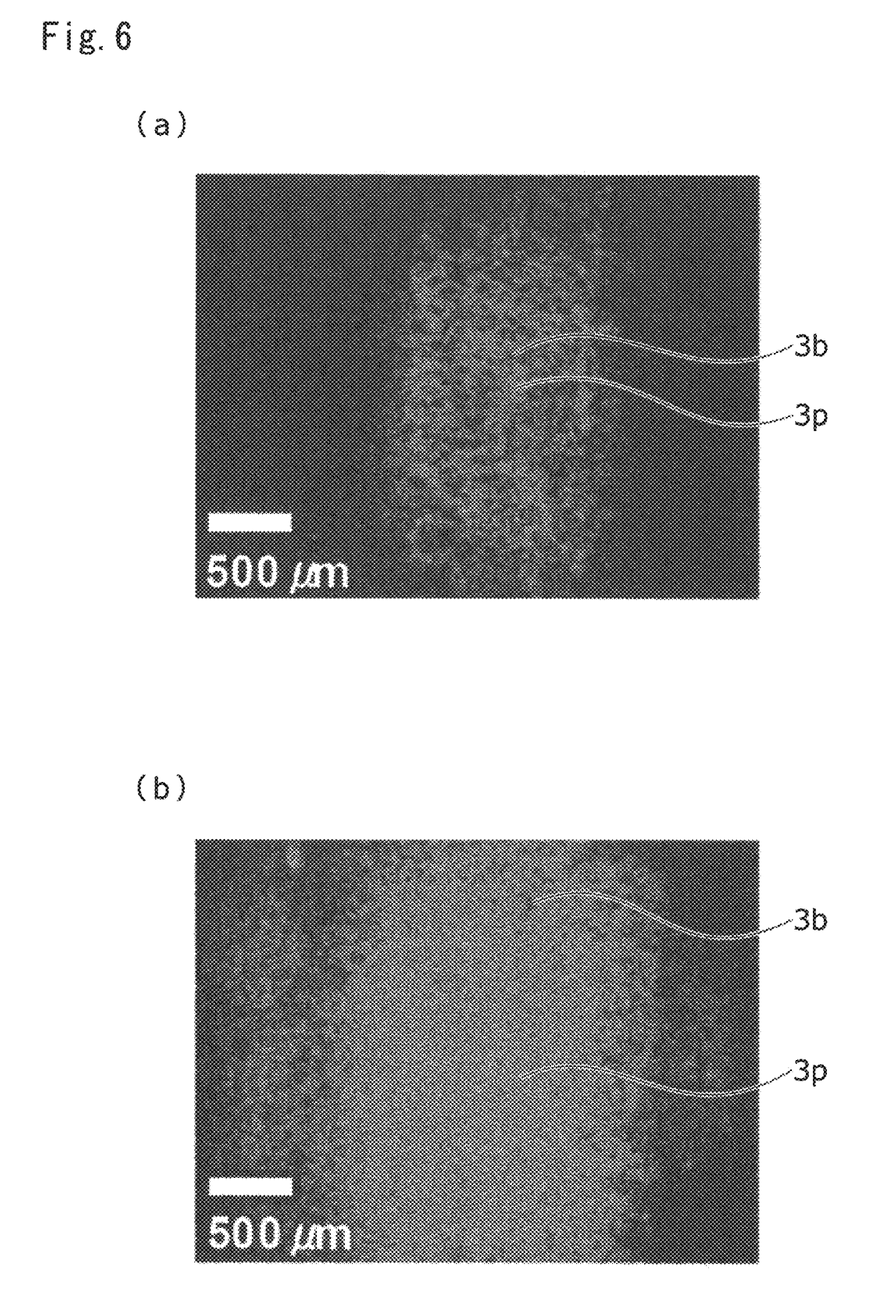
FIGS. 6A and 6B are images showing the fluorescence region of the sliding portion of the sliding body in the first embodiment.

FIG. 4 illustrates results of the arithmetic average height (Sa) of the sliding portion 3a of the sliding body 3. It was confirmed that a smooth sliding surface is rapidly formed in a running-in process and a nanometer-order change continues according to a sliding distance even after occurrence of friction reduction to form an ultra-smooth sliding surface.

The present inventor(s) has found that the transformed portion chemically changed from SiC due to, e.g., amorphization shows fluorescence, and it has been found that a running-in process can be clarified by observation/evaluation of the transformed portion according to a fluorescence phenomenon. Detailed description will be made hereinafter.

It has been confirmed that when the sliding portion 3a is observed with the confocal scanning microscope 16, a large portion of the sliding surface having showed friction reduction is the transformed portion although pores filled with wear powder are locally present.

It is assumed that in the running-in process, there are two types of action which are wear accompanied by transformation of SiC and filling of the pores with the wear powder. It has been confirmed that when the smooth sliding surface is formed in the running-in process and Sa decreases (see FIG. 4), the fluorescence region increases (see FIG. 5). That is, it has been confirmed that in a sliding distance range of 100 m to 400 m, Sa rapidly decreases from 0.05 to 0.01 while the fluorescence region rapidly increases from 20% to 80%. This has found that when Sa decreases, the transformed portion changed chemically and showing friction reduction rapidly increases.

FIG. 6A illustrates an image of the surface of the sliding portion 3a captured by the confocal scanning microscope 16 when the sliding distance is 98 m, and a white portion indicates the fluorescence region. Similarly, FIG. 6B illustrates the fluorescence region when the sliding distance is 200 m. The fluorescence region is the transformed portion 3p, and a black portion is the untransformed base material portion 3b. From FIGS. 6A, 6B, and 5, it has been confirmed that Sa and the fluorescence region both show a significant change particularly in a range of 98 m to 200 m in which the coefficient of friction increases and the fluorescence region significantly increases. Moreover, even in an initial running-in stage (98 m) and after occurrence of friction reduction to equal to or lower than a friction coefficient of 0.05, slight expansion of the fluorescence region was confirmed, and it has been found that the chemical change continues even after occurrence of friction reduction since an initial friction stage. That is, a large portion of the sliding surface having showed friction reduction is the transformed portion, and for this reason, a probability that the chemical change in the transformed portion can be grasped with high sensitivity by fluorescence observation has been suggested.

As described above, it has been found that the chemical change in SiC due to friction energy serves as a trigger, geometric stability is provided by the action that the pores are filled with the wear powder caused from the transformed SiC while the SiC surface is smoothly worn, and a low-friction interface is formed when the chemical change in the transformed portion becomes stable.

Moreover, it has been found that the wear powder filling the pores has a higher luminance than that of the transformed portion. Thus, in arithmetic analysis of the sliding portion 3a by the arithmetic apparatus, the step of excluding a region with a luminance equal to or higher than a predetermined luminance from a light emission area is performed so that influence of the wear powder filling the pores of the surface of the sliding portion 3a can be excluded and the area of the formed transformed portion can be reliably evaluated.

Further, details of the chemical change in the transformed portion have been confirmed by TEM observation and spectral analysis. According to such TEM observation, a nano interface having the transformed portion across a large portion and having a thickness of several nm was, unlike SiC of the base material, formed at any of the sliding surface (e.g., the sliding surface in the case of a sliding distance of 519 m) shortly after occurrence of friction reduction and the sliding surface (e.g., the sliding surface in the case of a sliding distance of 10 km) sufficiently slid after occurrence of friction reduction. Considering that a wear depth becomes greater by about 30 nm from a sliding distance of 519 m to 10 km, it can be estimated that the nano interface of several nm repeats wear and generation.

In the above-described experiment, the following conclusion was obtained:

(1) fluorescence observation can detect a fine chemical change in the transformed portion upon occurrence of friction reduction with high sensitivity, and can quantitatively evaluate the SiC-transformed region as the fluorescence region; and (2) due to two types of action which are wear accompanied by transformation of SiC of the base material and filling of the surface recessed portions with the wear powder, the smooth sliding surface is rapidly formed, and the fluorescence region showed by the transformed portion increases in the running-in process in which the arithmetic average height Sa decreases.

As described above, the sliding body surface evaluation method includes the first step of irradiating, between the sliding body 3 and the sliding target body 4 made of SiC, the sliding portion 3a of the sliding body 3 with the laser light 10, the second step of detecting the fluorescence as the light emitted from the transformed portion 3p irradiated with the laser light 10, and the third step of deriving a change in a light emission state of the sliding portion 3a. According to this method, a running-in phenomenon progress status can be evaluated from the change in the light emission state in which a SiC plateau portion is formed, and a decrease in the coefficient of friction can be reliably evaluated.

Moreover, the entire surface of the sliding portion 3a is scanned with the laser light 10, and the light emission area is calculated across the entire surface of the sliding portion 3a. Thus, e.g., a region of the sliding portion 3a where friction reduction is likely to occur can be evaluated. For example, a prominent "running-in phenomenon" in a specific region in the radial direction can be evaluated.

Further, the confocal scanning microscope is used for observation of the sliding portion 3a so that light emitted from the sliding portion 3a with a low luminance can be reliably detected.

In addition, the water is supplied as the lubricant to between the sliding body 3 and the sliding target body 4. According to this configuration, the low-viscosity water is utilized as the lubricant for the sliding portion, and therefore, the running-in phenomenon progress status of the surface of the sliding portion 3a can be observed with favorable accuracy.

Note that the test machine 30 may include a drive apparatus (not shown) capable of finely moving, in the upper-lower (Z-axis) direction, the height position of the field lens 18 of the confocal scanning microscope 16. According to this configuration, as illustrated in FIG. 7, the focal point of the confocal scanning microscope 16 is finely moved in a depth direction of the sliding portion 3a so that the sliding portion 3a can be three-dimensionally analyzed and the thickness of the formed transformed portion 3p can be observed. Further, the fluorescence region is observed for each depth so that a region where the transformed portion 3p is generated can be observed for each depth. The transformed portion 3p of the sliding portion 3a as described herein has a thickness of about several μm, and therefore, these types of observation are significant.

Note that for the sake of convenience in description, in the above-described embodiment, one arranged on a lower side as the test piece observed with the confocal scanning microscope 16 has been described as the sliding body 3, and one arranged on an upper side as a sliding partner of the sliding body 3 has been described as the sliding target body 4. However, the observation target is not distinguished by phrases of the sliding body and the sliding target body, and may be a sliding portion of the sliding target body arranged on the upper side.

Second Embodiment

Next, a sliding body surface evaluation method and a sliding body surface evaluation apparatus according to a second embodiment will be described with reference to FIG. 8. Note that description of the same overlapping configurations as those of the above-described embodiment will be omitted.

Figure 8:
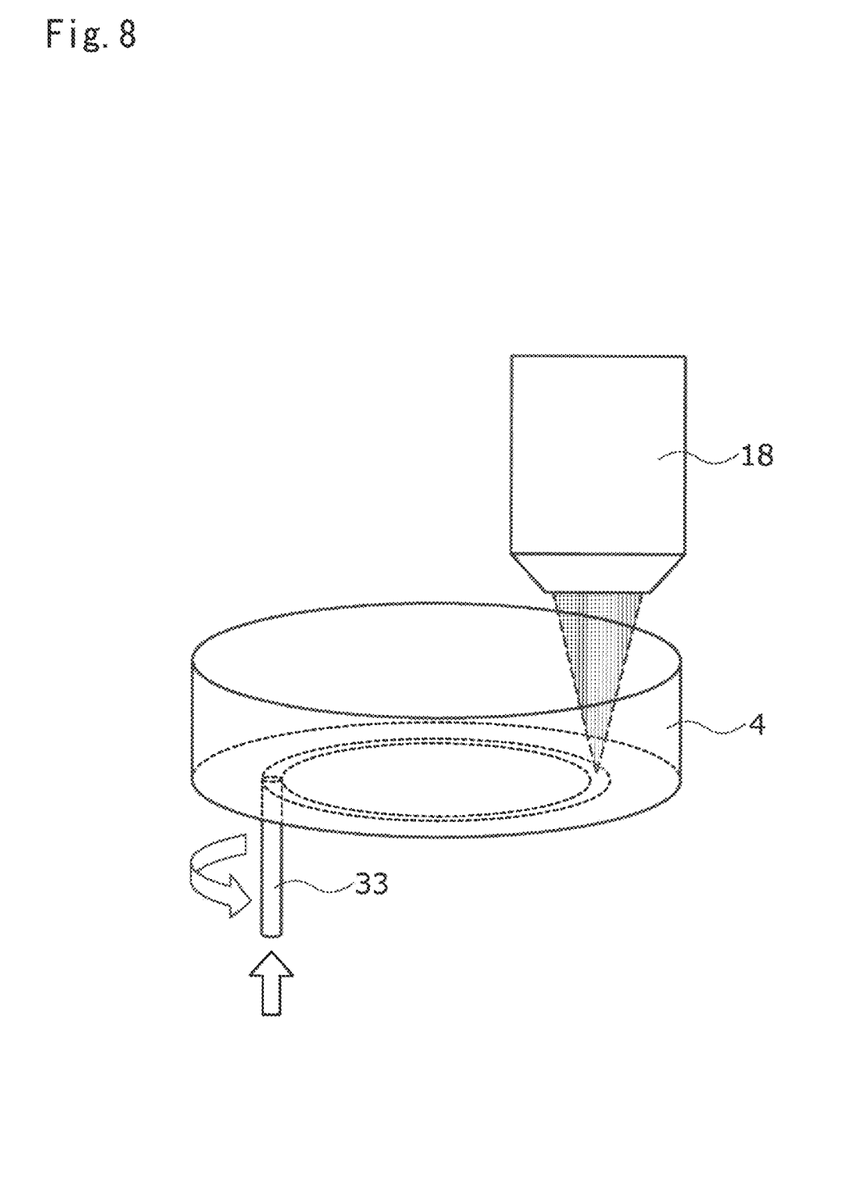
FIG. 8 is a schematic view illustrating a correspondence between a sliding body and a sliding target body in a second embodiment of the present invention.

In FIG. 8, a sliding body is a rod-shaped member 33 instead of a cylindrical member. In this case, a sliding portion of a sliding target body 4 is an observation target.

Third Embodiment

Next, a sliding body surface evaluation method and a sliding body surface evaluation apparatus according to a third embodiment will be described with reference to FIGS. 9A and 9B. Note that description of the same overlapping configurations as those of the above-described embodiments will be omitted.

Figure 9:
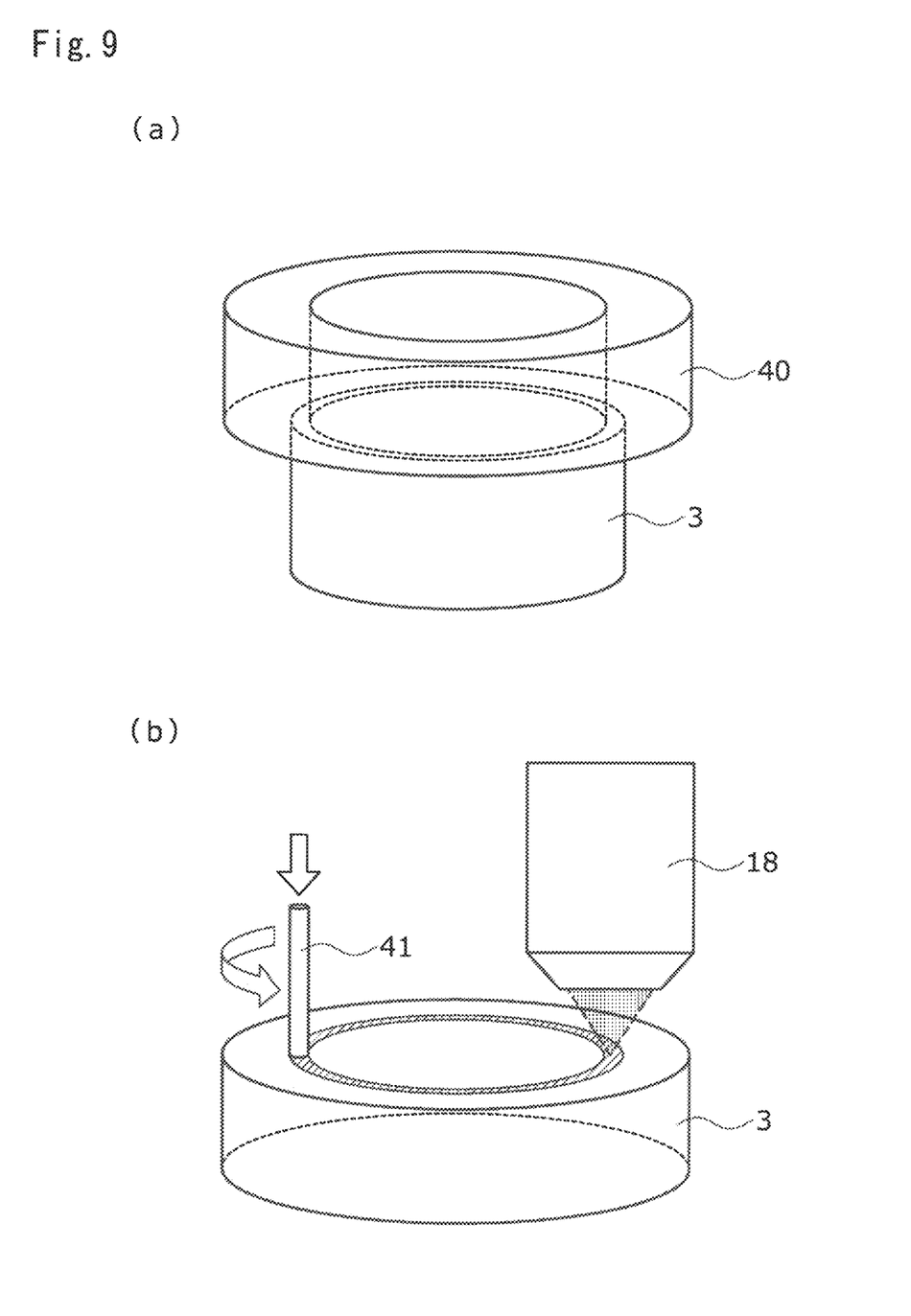
FIGS. 9A and 9B are schematic views illustrating a correspondence between a sliding body and a sliding target body in a third embodiment of the present invention.

In FIG. 9A, a sliding target body 40 is formed in a cylindrical shape from polycrystal SiC through which less laser light penetrates. In this case, after a sliding friction experiment has been conducted for a sliding body 3 and the sliding target body 40, the sliding target body 40 is detached, and a sliding portion 3a of the sliding body 3 is observed using a confocal scanning microscope 16 of a test machine 30. According to this configuration, the sliding body 3 and the sliding target body 40 can be made of materials similar to those in the case of a rotating seal ring and a stationary seal ring of a mechanical seal to be actually used, and an accurate sliding portion observation result can be obtained.

Moreover, FIG. 9B is a variation of FIG. 9A, and a sliding target body 41 is a rod-shaped member instead of the cylindrical member. In this case, at a position at which the sliding body 3 and the sliding target body 41 do not overlap with each other, the sliding portion 3a of the sliding body 3 can be observed using the confocal scanning microscope 16 without the need for detaching the sliding target body 41.

The embodiments of the present invention have been described above with reference to the drawings, but specific configurations are not limited to these embodiments. Even changes and additions made without departing from the scope of the present invention are included in the present invention.

For example, the test machine utilized for the sliding body surface evaluation method is not limited to the above-described configuration of the test machine 30.

Moreover, the sliding target body may be made of another material allowing light penetration, such as glass, instead of the monocrystal SiC. In this case, those close to the sliding body in terms of physical characteristics are preferable.

Further, the light source configured to irradiate the sliding portion 3a with an electromagnetic wave may be, e.g., a lamp other than the laser light source, and is not limited to visible light. An electromagnetic wave of invisible light such as ultraviolet light or infrared light may be employed.

In addition, as the microscope for observing the sliding portion 3a, those other than the above-described confocal scanning microscope may be used.

Moreover, the amorphous whose crystal structure has been transformed from the base material has been described as an example of the transformed portion 3p transformed from the base material. However, the transformed portion may be a portion whose material characteristics have been chemically, mechanically, or thermally transformed, and for example, includes a transformed portion due to oxidization.

Further, the sliding body 3 may be made of a material other than the ceramics, but ceramics such as SiC or $Al_2O_3$ is preferable.

In addition, the lubricant supplied to between the end surfaces of the sliding body 3 and the sliding target body 4 is not limited to the water, and for example, may be gas, a solvent, or oil.

Moreover, in FIG. 1 of the above-described embodiment, the water housed in the housing 2 is arranged only on the outer diameter side of the sliding body 3 and the sliding target body 4, but the present invention is not limited to above. The water may be arranged on an inner diameter side of the sliding body 3 and the sliding target body 4 or on both of the outer diameter side and the inner diameter side. Note that different types of lubricants may be arranged on the outer diameter side and the inner diameter side.

Further, the change in the light emission state may be one or both of the light emission area and the luminance, and may be a light emission state other than the light emission area and the luminance.

REFERENCE SIGNS LIST

1 Base
2 Housing
2a Bottom portion
2b Through-hole
2c Shaft portion
2d Side portion
3 Sliding body
3a Sliding portion
3b Base material portion
3p Transformed portion
4 Sliding target body
5 Bearing
6 Rotary shaft
7 Rotary drive source
8 Water
9 Light source
10 Laser light
11 Seal
12 Pinhole
16 Confocal scanning microscope
17 Fluorescence
18 Field lens 19 Beam splitter
20 Detector
23 Housing rotation control means
24 Servo motor
30 Test machine

The invention claimed is:

1. A sliding body surface evaluation method comprising:
a first step of irradiating, with an electromagnetic wave, a sliding portion of a sliding body sliding on a sliding target body;
a second step of detecting fluorescence characteristics of the sliding portion, which is generated when the sliding portion is irradiated with the electromagnetic wave;
a third step of deriving a fluorescence region in the sliding portion; and
a fourth step of evaluating running-in phenomenon of the sliding portion by detecting an increase of the fluorescence region.

2. The sliding body surface evaluation method according to claim 1, wherein
the first step includes a step of scanning an entire surface of the sliding portion with the electromagnetic wave.

3. The sliding body surface evaluation method according to claim 2, wherein
the first step includes a step of irradiating the sliding portion with the electromagnetic wave while rotatably driving the sliding body.

4. The sliding body surface evaluation method according to claim 1, wherein
the third step includes a step of excluding a region with a luminance of equal to or higher than a predetermined luminance from the fluorescence region.

5. The sliding body surface evaluation method according to claim 1, wherein
the first step includes a step of performing scanning with the electromagnetic wave by a confocal scanning microscope.

6. The sliding body surface evaluation method according to claim 5, wherein
the first step includes a step of finely moving a focal point of the confocal scanning microscope in a depth direction of the sliding portion.

7. A sliding body surface evaluation apparatus comprising:
a holding member configured to hold a sliding body;
a rotary drive configured to rotatably drive the sliding body;
an irradiation device configured to irradiate a sliding portion of the sliding body with an electromagnetic wave;
a detector configured to detect fluorescence characteristic of the sliding portion, which is generated when the sliding portion is irradiated with the electromagnetic wave; and
an arithmetic device configured to evaluate running in phenomenon of the sliding portion by deriving a fluorescence region and calculating an increase of the fluorescence region, based on the fluorescence detected by the detector.

8. The sliding body surface evaluation apparatus according to claim 7, further comprising:
a second holding member configured for holding a sliding target body sliding on the sliding body,
the sliding target body allowing penetration of the electromagnetic wave and the fluorescence and the irradiation device being arranged at a position at which the sliding portion of the sliding body is irradiated with the electromagnetic wave through the sliding target body.

9. The sliding body surface evaluation apparatus according to claim 8, wherein
the sliding body is polycrystal SiC, and the sliding target body is monocrystal SiC.

10. The sliding body surface evaluation apparatus according to claim 8, wherein
water is, as a lubricant, supplied to between the sliding body and the sliding target body.

11. The sliding body surface evaluation method according to claim 2, wherein
the first step includes a step of performing scanning with the electromagnetic wave by a confocal scanning microscope.

12. The sliding body surface evaluation method according to claim 3, wherein
the first step includes a step of performing scanning with the electromagnetic wave by a confocal scanning microscope.

13. The sliding body surface evaluation method according to claim 4, wherein
the first step includes a step of performing scanning with the electromagnetic wave by a confocal scanning microscope.

14. The sliding body surface evaluation apparatus according to claim 9, wherein
water is, as a lubricant, supplied to between the sliding body and the sliding target body.

* * * * *